Nov. 8, 1927.
C. T. HOLLENBACK
1,648,481
MEASURING AND DISPENSING DEVICE
Filed Dec. 2, 1925    2 Sheets-Sheet 1
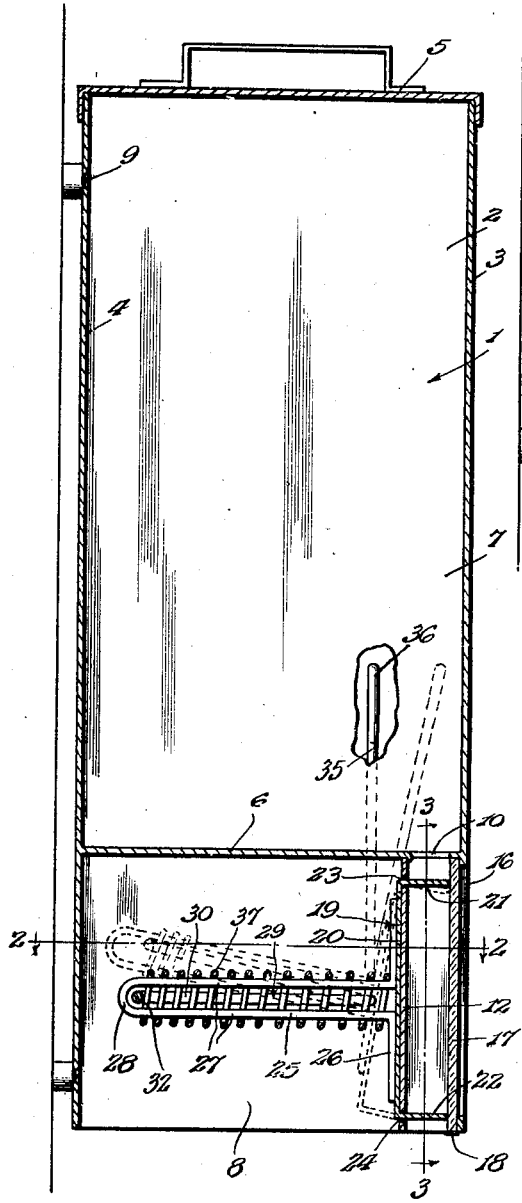
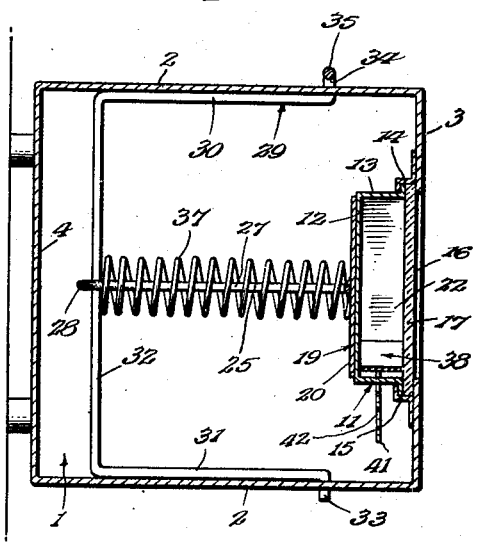
Inventor
C. T. Hollenback.
By _____, Attorneys Nov. 8, 1927.

C. T. HOLLENBACK 1,648,481

MEASURING AND DISPENSING DEVICE

Filed Dec. 2, 1925    2 Sheets-Sheet 2

Inventor

C. T. Hollenback.

By Lacy & Lacy, Attorneys

Patented Nov. 8, 1927.

1,648,481

UNITED STATES PATENT OFFICE.

CHARLES T. HOLLENBACK, OF LA PORTE, INDIANA.

MEASURING AND DISPENSING DEVICE.

Application filed December 2, 1925. Serial No. 72,789.

This invention relates to improvements in measuring devices for dispensing containers and while designed primarily for the measuring of granular coffee, may be employed equally as well for the measuring of other commodities.

One of the objects of the present invention is to provide a measuring device of the class described so constructed that it may be readily operated to measure and discharge, from the reservoir or container, a predetermined quantity of coffee without any likelihood of waste of the substance, the device being of such a nature that it may be readily mounted upon a wall or other supporting surface with its measuring and discharge spout spaced from the wall a sufficient distance to permit of the positioning of a coffee pot therebeneath.

Another object of the invention is to so construct the device that, normally, air will be excluded from the coffee within the container so that there will be no loss of strength of the coffee and no likelihood of insects entering the device by way of the delivery and measuring spout.

Another object of the invention is to so construct the device that it will be extremely simple in its structure and may be manufactured at a low cost and may, further, be readily manipulated or operated without any likelihood of disarrangement of its component parts.

Another important object of the invention is to provide means whereby the amount of coffee delivered at each operation of the device may be varied in accordance with the strength of the coffee.

In the accompanying drawings:

Figure 1 is a vertical front to rear sectional view through one form of measuring device embodying the invention, the parts being shown in full lines in normal position and in dotted lines in a position to discharge the measured quantity of coffee.

Figure 2 is a horizontal sectional view taken substantially on the line 2—2 of Figure 1, looking in the direction indicated by the arrows.

Figure 3 is a vertical transverse sectional view taken substantially on the line 3—3 of Figure 1, looking in the direction indicated by the arrows.

Figure 4:
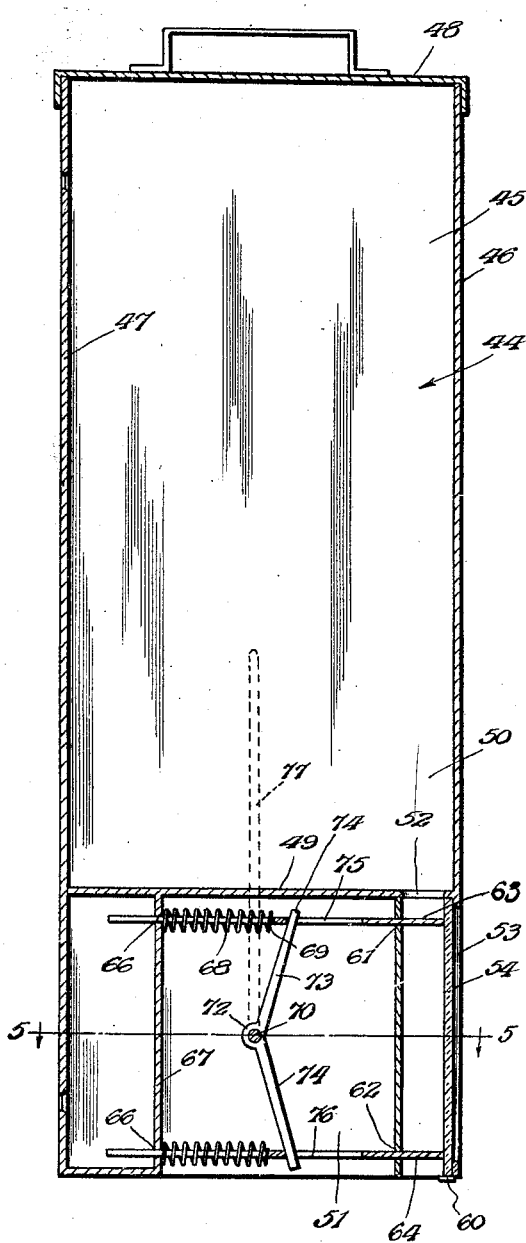
Figure 4 is a view similar to Figure 1, illustrating a modified form of the invention.

Referring first to the embodiment of the invention illustrated in Figures 1, 2 and 3 of the drawings, the device is illustrated as comprising a hollow rectangular casing indicated in general by the numeral 1, which comprises side walls 2, a front wall 3, and a rear wall 4, the casing being open at its upper end and provided with a removable closure indicated by the numeral 5, so that coffee may be readily introduced into the same. A horizontal partition 6 divides the casing interiorly into a container compartment indicated by the numeral 7, of which the partition 6 constitutes the bottom, and a lower compartment 8 in which the device of the invention is housed. Any suitable means, such for example as screws 9, are employed for securing the rear wall 4 of the casing to a wall or other upright support, or the device as an entirety may be fixedly supported in any other desired manner.

From the container 7, the coffee is discharged through a rectangular opening 10 formed in the partition 6 immediately rearwardly of the front wall 3, and a combined measuring and delivery spout, indicated in general by the numeral 11, is arranged beneath the partition 6 and in rear of the lower portion of the said wall 3. This spout preferably comprises a rear wall 12 and side walls 13, which latter walls are provided with flanges at their forward edges, indicated by the numeral 14, these flanges inter-engaging with flanges 15 which are secured upon the inner side of the wall 3 and extend vertically beneath the partition 6. An opening 16 is preferably formed in the front wall 3 at the front of the spout, and a pane 17 of glass or other transparent material, is fitted at its vertical edges in the flanges 15 and extends over the said opening 16 so that the contents of the spout may be readily observed. Supporting tongues 18 are formed upon the lower ends of the flanges 15 and engage the lower corners of the pane 17 and the lower ends of the flanges 14 and thereby serve to support the pane and the spout in proper position, the said pane constituting the front wall of the spout and the spout being open at its upper and lower ends and at its said upper end being in communication with the opening 10, as clearly shown in Figures 1 and 3 of the drawings.

In order that a predetermined quantity of coffee may be admitted to the spout 11 and subsequently discharged therefrom, means is provided which will now be described. The numeral 19 indicates in general an oscillatory valve member which comprises a rectangular sheet metal body 20 provided at its upper and lower edges with flanges 21 and 22 respectively, which constitute valve elements. The body or plate 20 is disposed against the outer side of the rear wall 12 of the spout with the said valve elements 21 and 22 fitting loosely through slots 23 and 24 formed in the said rear wall 12 and extending transversely thereof near the upper and lower edges thereof. It will be observed that the valve elements or flanges 21 and 22 extend at right angles from the plate 20 and that, normally, they extend both longitudinally and forwardly across the spout with their free edges engaging against the inner side of the pane 17 and that when the valve is in normal position, these valve elements, the pane 17, the side walls 13 of the spout, and the rear wall 12 thereof, define an enclosed space having a definite cubical area. The numeral 25 indicates a yoke having right angularly extending ends 26 which are vertically disposed and slotted or otherwise secured to the rear side of the body 20 of the valve, the yoke being vertically disposed and extending rearwardly from the said body of the valve within the compartment 8. The yoke may be formed from a single piece of wire bent to comprise the attaching portions 26 and spaced parallel portions 27 which are connected at their rear ends by a bight or bend 28, or a slotted arm in the nature of a strip of metal may be equally as well employed. The numeral 29 indicates in general a rocker which is to cooperate with the yoke 25 to actuate the valve and this rocker may be formed from a length of wire bent to provide spaced side members 30 and 31 and a connecting cross member 32 which extends between the rear ends of said side members and, normally, through the bight 28 of the yoke 25. The forward end of the arm 31 is turned laterally to provide a pintle portion 33 pivotally engaged in an opening in one of the side walls of the casing, and the forward end of the other side member 30 is bent laterally to provide a similar pintle portion 34, and thence upwardly to provide a lever arm 35 terminating at its upper end in a finger piece 36 adapting the lever arm to be readily rocked in a forward and rearward direction so as to upwardly and downwardly swing the rocker 29 and effect corresponding movement of the yoke 25. The lever arm 35 extends upwardly beside one side wall of the casing and is located near the front of the casing so that it may be readily actuated. A compression spring 37 is fitted upon the yoke 25 and bears at one end against the inner ends of the arms 26 and at its outer end against the cross member 32 of the rocker 29 and serves to normally hold the parts in the full line position shown in the several figures above referred to. It will now be apparent, and particularly by reference to Figure 1 of the drawings that in the normal position of the valve, both of the valve elements 21 and 22 extend across the upper and lower ends of the spout 11, respectively. When it is desired to discharge a measured quantity of coffee from the container 7, the lever arm 35 is first swung rearwardly, resulting in a downward swinging of the rocker 29 and a tilting of the valve body 20 rearwardly to retract the valve element 21 through the slot 23 and permit coffee to flow into the spout until the spout is substantially full, whereupon the lever may be released and the spring will assist in returning it to its intermediate position, in which position the valve will assume its normal position. It will be evident at this point that in the tilting movement of the valve, the bend which defines the juncture between the valve element 22 and the body of the valve, will work in the slot 24 in the manner of a fulcrum. The forward movement of the lever from its first mentioned position is continued past its normal position until the lever assumes substantially the dotted line position shown in Figure 1, and at such time the valve body will be tilted to the dotted line position shown in said figure and the valve element 22 will be retracted through the slot 24, the bend between the valve element 21 and valve body 20 working, at this time, in the slot 23 in the manner of a fulcrum. When the valve is tilted to this position, the coffee which has been delivered to the spout will, of course, be discharged from the lower end thereof. As a matter of fact, the coffee will flow from the container 7 into the measuring and delivery spout sufficiently rapidly to permit of practically continuous backward and forward movement of the lever arm 35 in measuring and delivering the predetermined quantity of coffee. In any event, the user may determine whether or not the spout is filled, through the medium of the glass pane 17.

Ordinarily, the spout will be so proportioned that when filled it will contain precisely the quantity of coffee required to make one cup of the beverage but where stronger brands of coffee are used or where the wishes of the user of the device may dictate, it will be desirable to vary the quantity of coffee delivered from the device at each operation thereof so that less than the maximum quantity will be delivered. The means for accomplishing this result comprises a baffle plate which is indicated by the numeral 38 and which is of a width substantially equal to the front to rear interior dimension of the spout, and this plate at its upper end is bent to provide an overturned lip 39 which is freely engaged through a slot 40 formed in one side wall 13 of the spout 11, so that the plate may have swinging adjustment toward and away from the said side wall. Secured in any suitable manner at one end to the lower end portion of the plate at that face thereof which opposes the side wall of the spout, is a resilient adjusting and holding strip 41 which is formed with a series of crimps or corrugations 42 and which is preferably substantially arcuate from end to end and works in a slot 43 formed in the side wall of the spout upon which the baffle plate 38 is mounted. This side wall of the spout is spaced from the respective side wall of the casing a sufficient distance to permit of the user of the device reaching upwardly within the compartment 8 and grasping the end of the adjusting strip 41 to move the same sidewise, or in the direction of its length, to swingingly adjust the baffle plate 38, the corrugations or crimps coacting with the lower wall of the slot 40 to hold the plate 38 in any position to which it may be adjusted. It will now be evident that by adjusting this plate 38, complete filling of the spout cannot occur, and a quantity of coffee less than the maximum quantity equivalent to the cubical area of the spout, will be delivered thereto, depending upon the extent to which the baffle plate is swung away from the side wall of the spout. Of course, if the plate is swung to position lying directly against the side wall of the spout, then the full quantity of coffee will be delivered to the spout.

Figure 5:
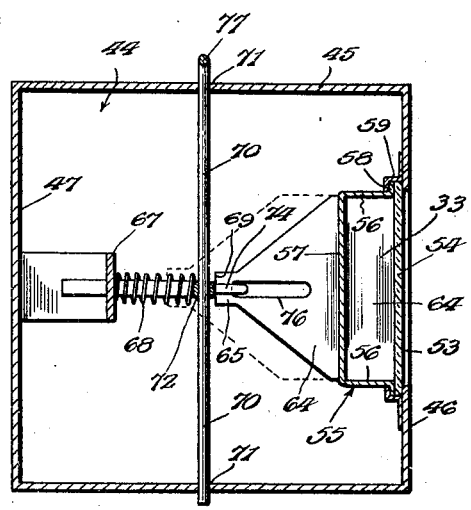
Figure 5 is a horizontal sectional view taken substantially on the line 5—5 of Figure 4, looking in the direction indicated by the arrows.

In the embodiment of the invention illustrated in Figures 4 and 5 of the drawings, the casing of the device is indicated in general by the numeral 44 and comprises side walls 45, a front wall 46, and a rear wall 47, the casing being closed at its top by a removable lid or cover 48. A partition 49 divides the lower portion of the casing horizontally so as to provide a container 50 corresponding to the container 7, and a compartment 51 for the measuring and dispensing device corresponding to the compartment 8 of the previously described form. The partition 49 is formed with an opening 52 corresponding to the opening 10 of the previously described form, and the front wall 46 of the casing is formed with an opening 53 in which is arranged a glass pane 54 constituting the front wall of the spout, which is indicated in general by the numeral 55 and comprises side walls 56 and a rear wall 57, the said side walls 56 having outstanding flanges 58 at their vertical free edges engaging with flanges 59 secured upon the inner side of the front wall 46 of the casing below the partition 49, the vertical edges of the glass pane 54 being likewise engaged in the flanges 59 and the said flanges 59 having portions 60 at their lower ends constituting retaining means for the lower corners of the pane 54 at the lower ends of the flanges 58. The upper end of the spout substantially registers with the opening 52 so that coffee may be delivered from the container 50 into the said spout, as in the previously described embodiment of the invention. The rear wall 57 of the said spout is formed with slots 61 and 62 located respectively near the upper and lower ends of the said wall and valve plates 63 and 64 are slidably mounted in these slots respectively. The said valve plates are provided with stems 65 which project therefrom and through slots 66 formed in an upstanding guide 67 located within the rear portion of the compartment 51, and springs 68 are arranged upon the stems and bear at their rear ends against said guide 67 and at their forward ends against shoulders which are indicated by the numeral 69 and are formed at the juncture of the forward ends of the stems with the respective valve plates. The springs 68, of course, serve to normally hold both of the valve plates in closed position, and means is provided for effecting retraction of said plates individually, as will now be described. The numeral 70 indicates a shaft which is journaled through openings 71 formed in the side walls of the compartment 51, and fixed upon this shaft midway between its ends is a rocker comprising a hub portion 72 and upwardly and downwardly extending arms 73 and 74 respectively, which respectively engage at their upper and lower ends in slots 75 and 76 formed in the valve plates rearwardly of their portions which extend into the spout 55. A lever arm 77 extends upwardly from one end of the said shaft 70 and may be grasped and swung so as to rock the shaft and effect corresponding movement of the rocker. It will be observed by reference to Figure 4 of the drawings, that normally, the ends of th arms of the rocker engage in the rear ends of the respective slots in the valve plates, and consequently, when the lever arm 77 is swung rearwardly, the rocker arm 73 will retract the valve plate 63 against the tension of the spring 68, whereas the lower end of the rocker arm 74 will ride freely forwardly in its respective slot 76 without any resulting movement of the valve plate 64. Therefore, coffee will flow downwardly from the container into the spout, and when the lever is swung forwardly, the valve plate 63 will be returned to its normal or original position through the medium of the spring 68 and, at the same time, the valve plate 64 will be retracted so as to provide for the discharge of the coffee which has been previously delivered to the spout. This embodiment of the invention will, of course, be supported in substantially the same manner as the previously described embodiment and it possesses all of the advantages which have heretofore been outlined.

Having thus described the invention, what I claim is:

1. In measuring and dispensing apparatus, a container, a spout extending from the bottom thereof, a valve comprising a body member disposed against the spout and upper and lower valve elements extending from the body member and into the spout, an arm extending from the body member, a rocker mounted for oscillatory movement and including a portion coacting with the said arm to effect up and down swinging movement of the arm upon oscillation of the rocker, and a lever arm associated with the rocker and movable to effect oscillation of the rocker and thereby effect tilting of the said valve to alternately reversely swing the upper and lower ends of the body member of the valve away from the spout and thereby alternately retract the valve elements.

2. In measuring and dispensing apparatus, a container, a spout extending from the bottom thereof, a valve comprising a body member disposed against the spout and upper and lower valve elements extending from the body member and into the spout, an arm extending from the body member, a rocker mounted for oscillatory movement and including a portion coacting with the said arm to effect up and down swinging movement of the arm upon oscillation of the rocker, a lever arm associated with the rocker and movable to effect oscillation of the rocker and thereby effect tilting of the said valve to alternately reversely swing the upper and lower ends of the body member of the valve away from the spout and thereby alternately retract the valve elements, and a spring engaged upon the said arm and bearing between the body member of the valve and the said portion of the rocker to normally retain the valve in position with both of said valve elements extending across the spout.

In testimony whereof I affix my signature.

CHARLES T. HOLLENBACK. [L. S.]